Oct. 11, 1938.   R. FARIES   2,132,612
TRUCK
Filed Oct. 1, 1936   16 Sheets-Sheet 1
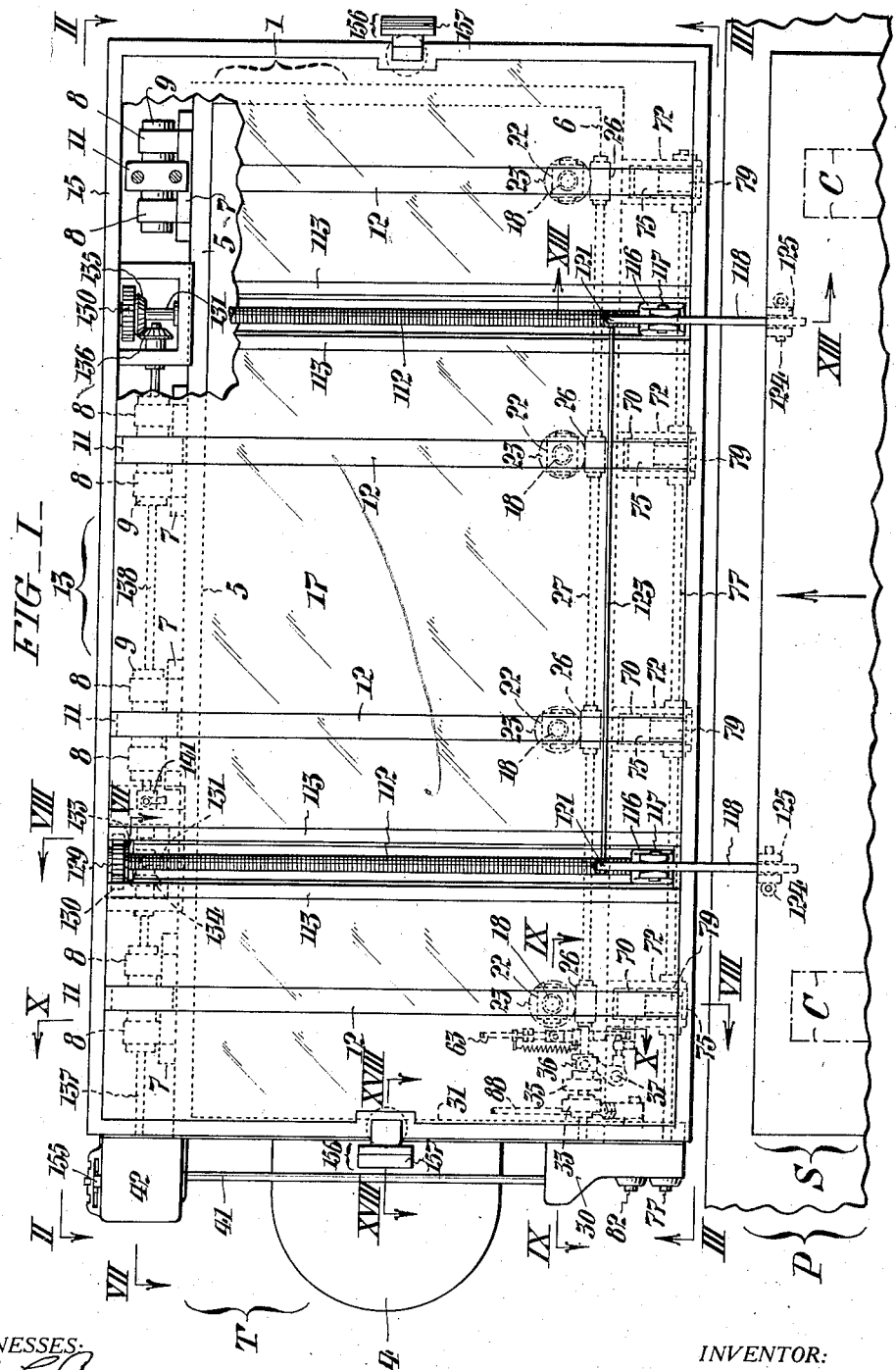
INVENTOR:
Robert Faries,

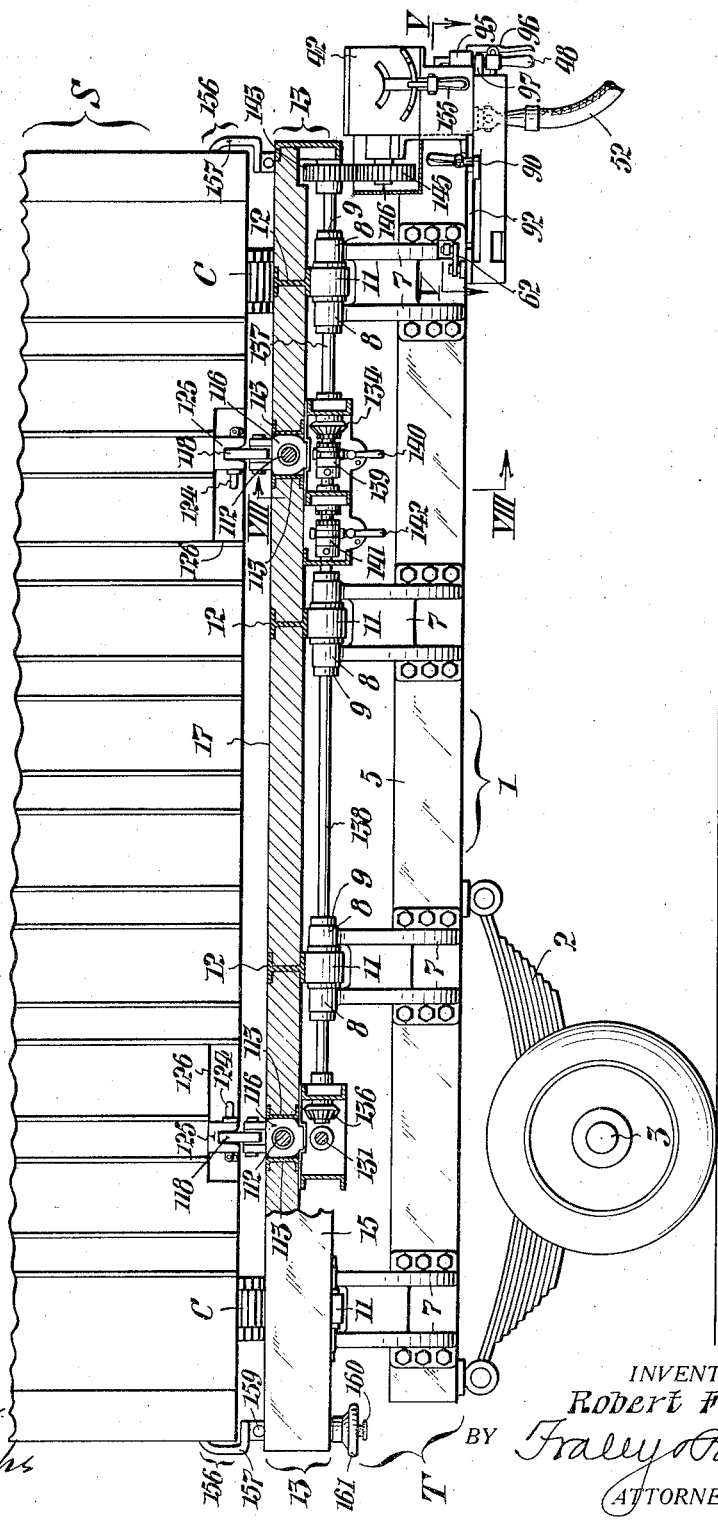

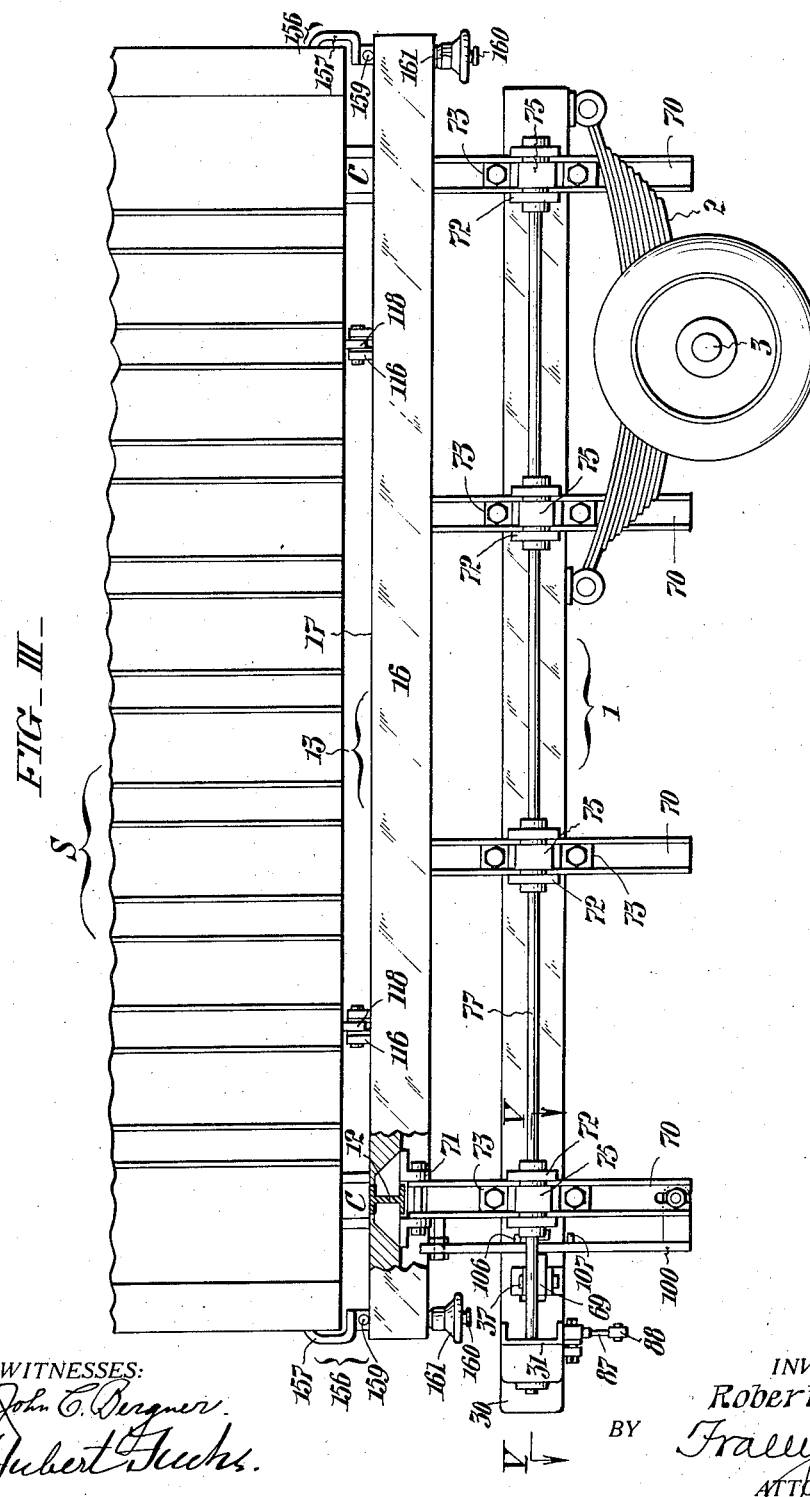

Oct. 11, 1938.  R. FARIES  2,132,612
TRUCK
Filed Oct. 1, 1936  16 Sheets—Sheet 4
FIG. IV
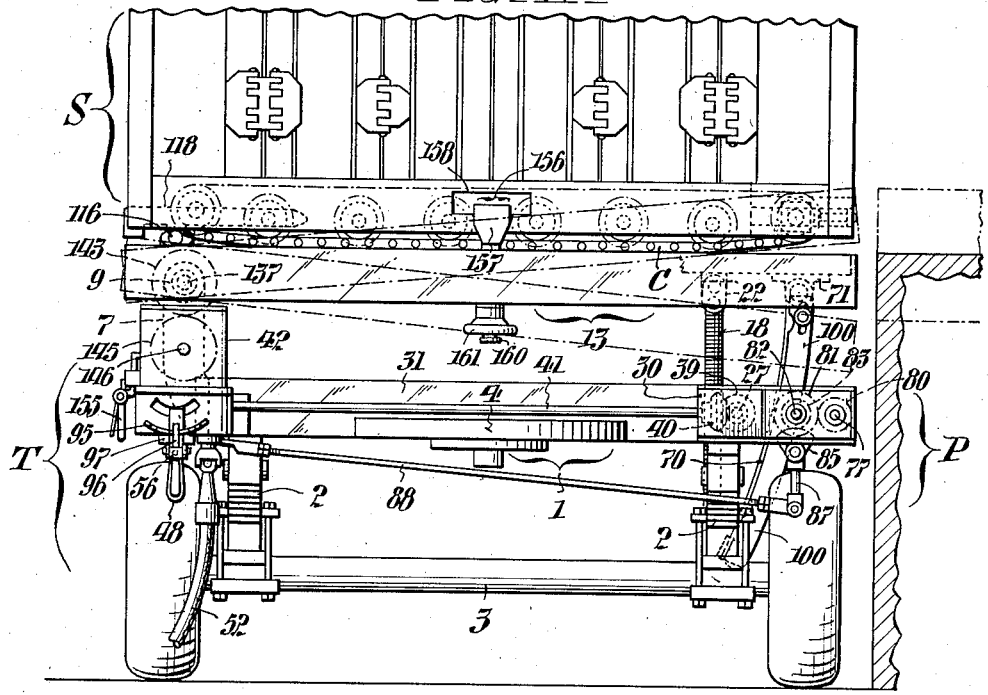
FIG. VIII
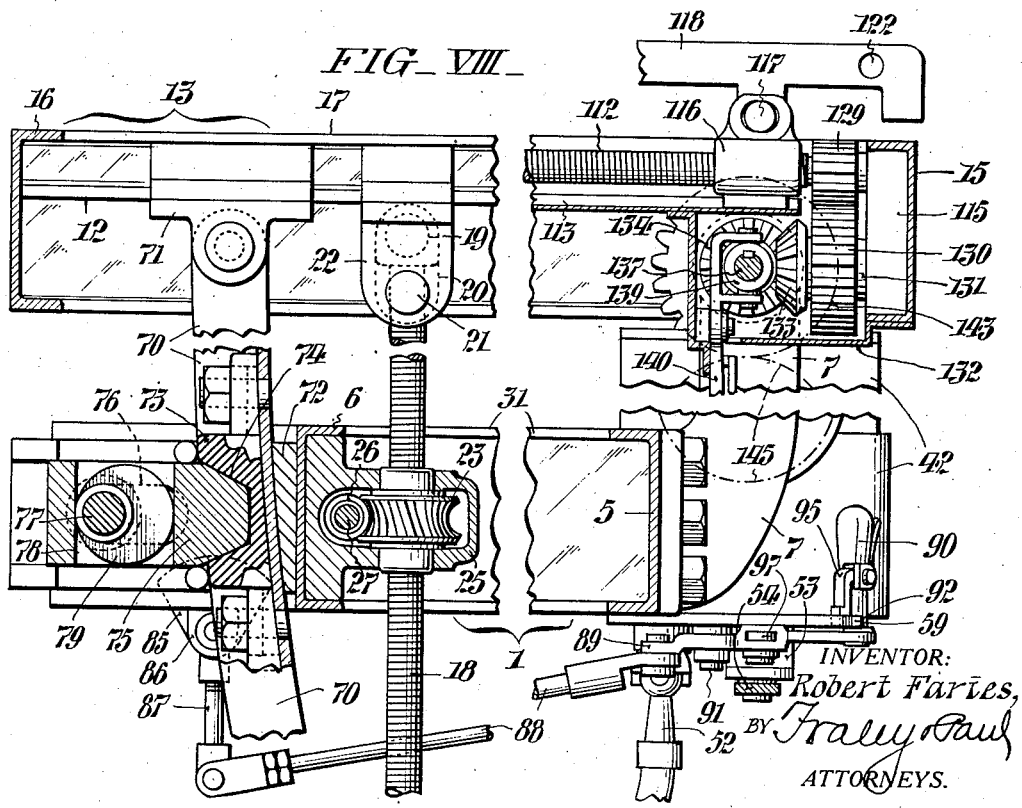
INVENTOR:
Robert Faries,
BY Fraley Paul
ATTORNEYS.

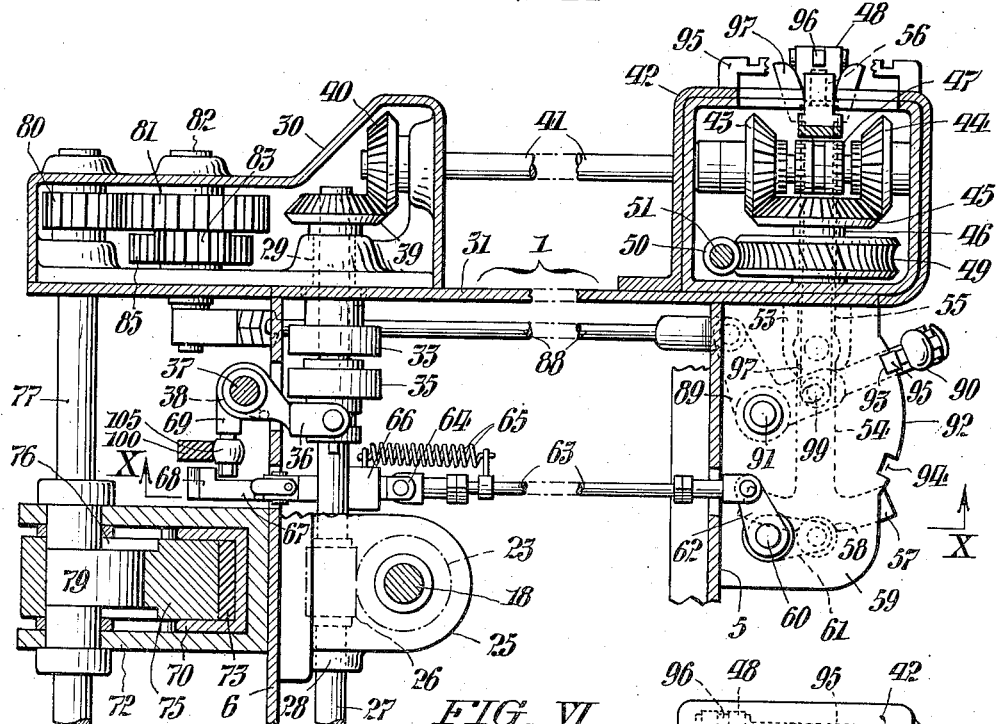
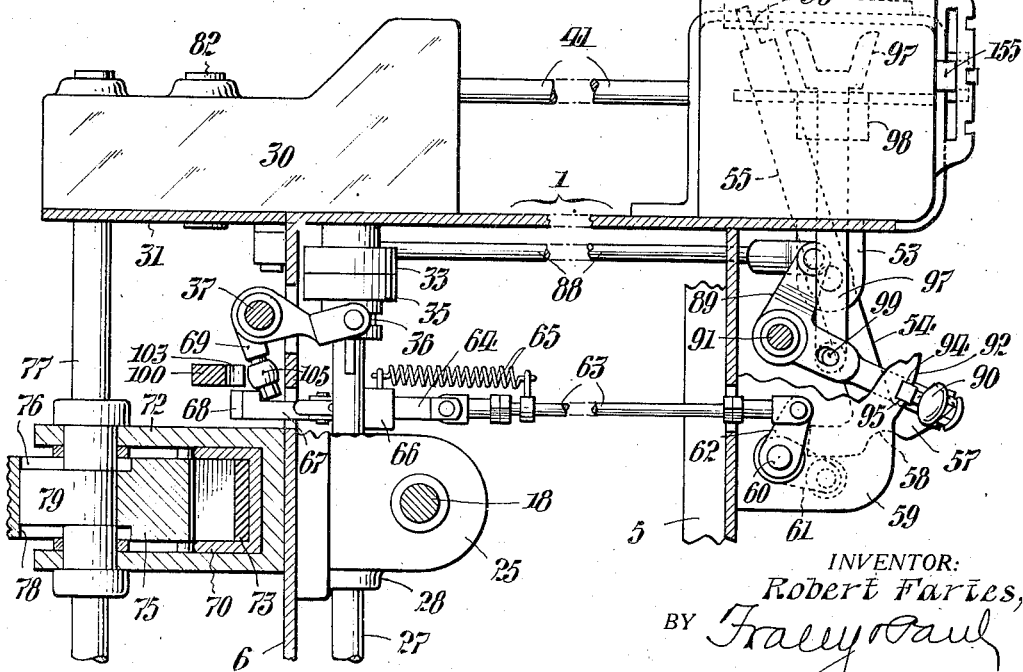

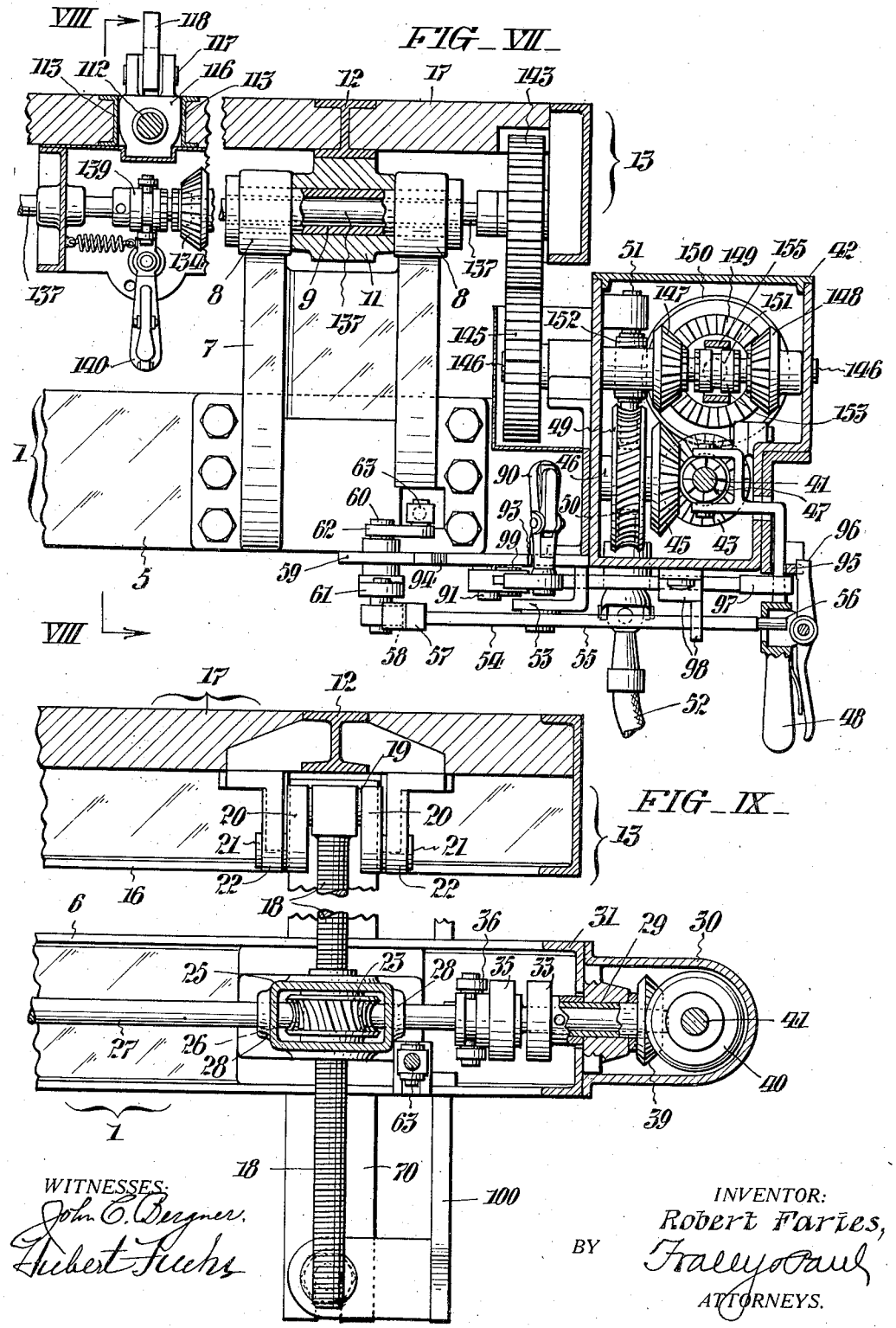

Oct. 11, 1938.   R. FARIES   2,132,612
TRUCK
Filed Oct. 1, 1936   16 Sheets-Sheet 7
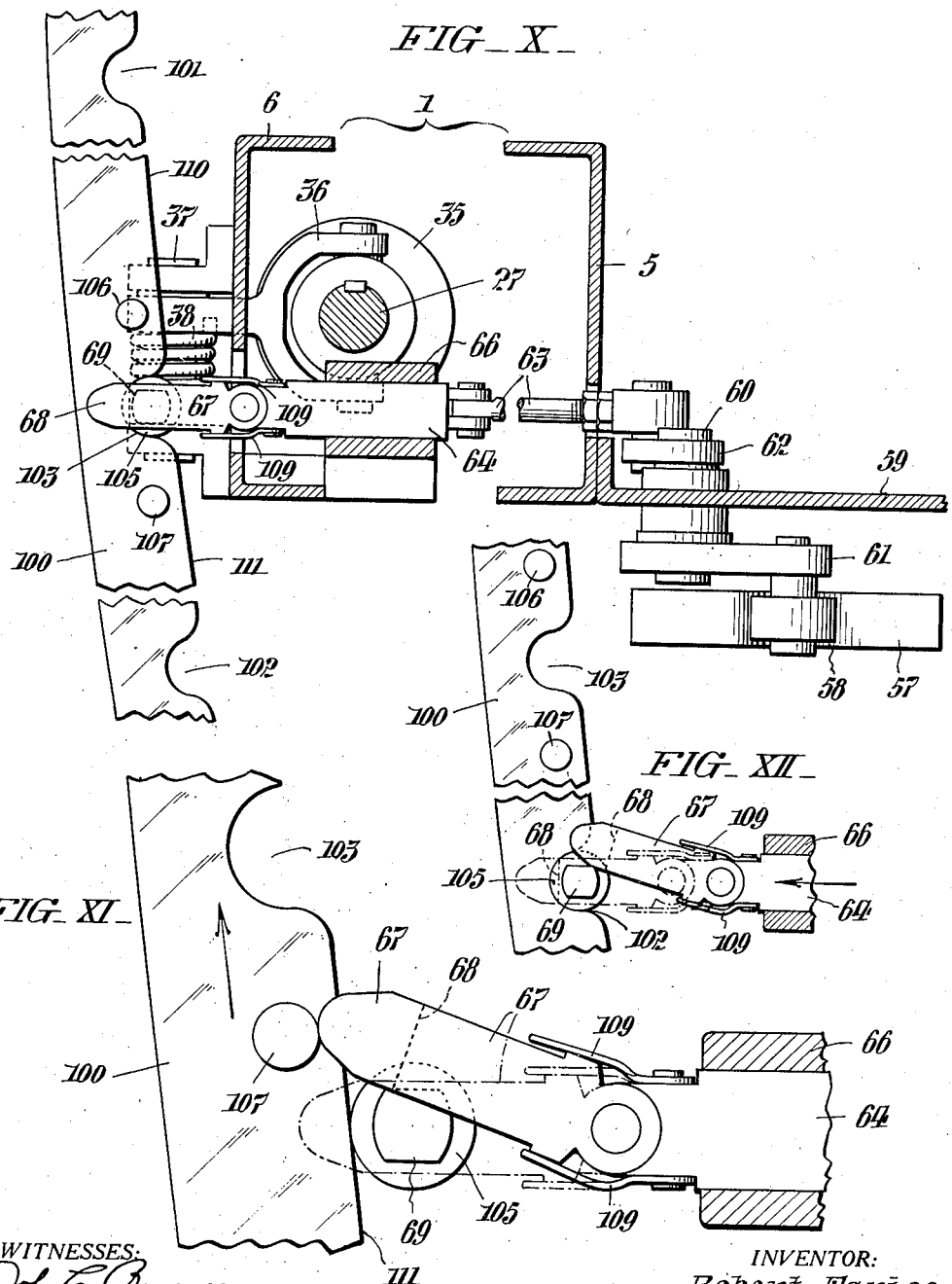

Oct. 11, 1938.   R. FARIES   2,132,612
TRUCK
Filed Oct. 1, 1936   16 Sheets-Sheet 8
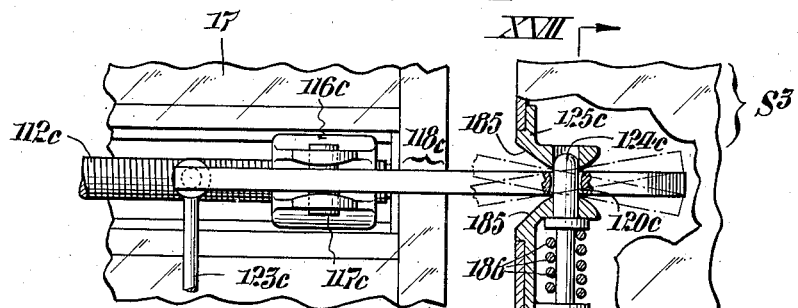
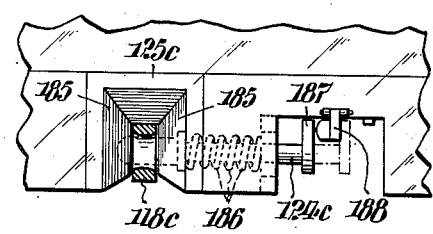
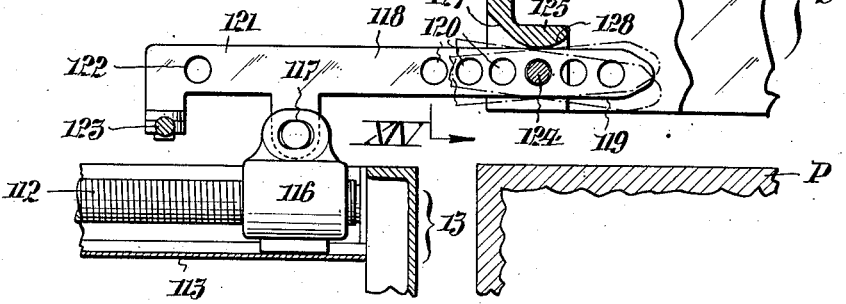
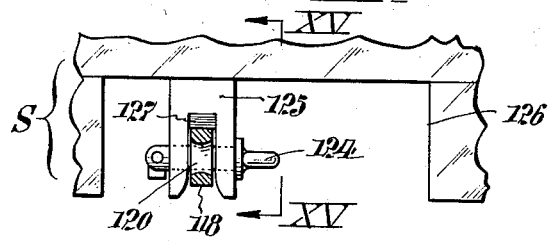
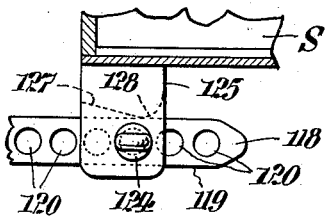
INVENTOR.
Robert Faries,
ATTORNEYS.

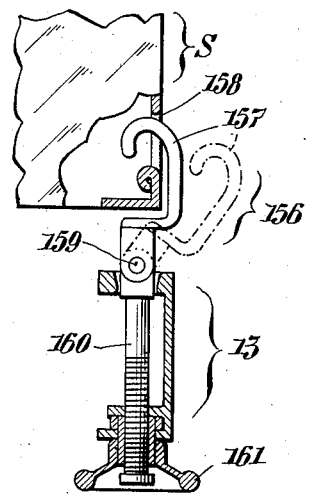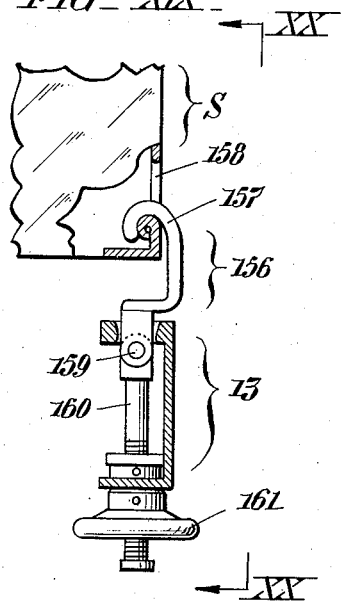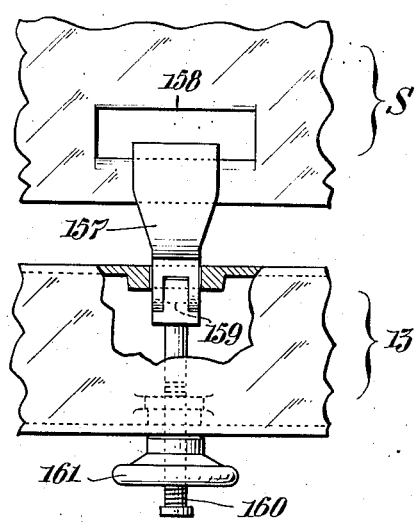

Oct. 11, 1938.   R. FARIES   2,132,612
TRUCK
Filed Oct. 1, 1936   16 Sheets-Sheet 10
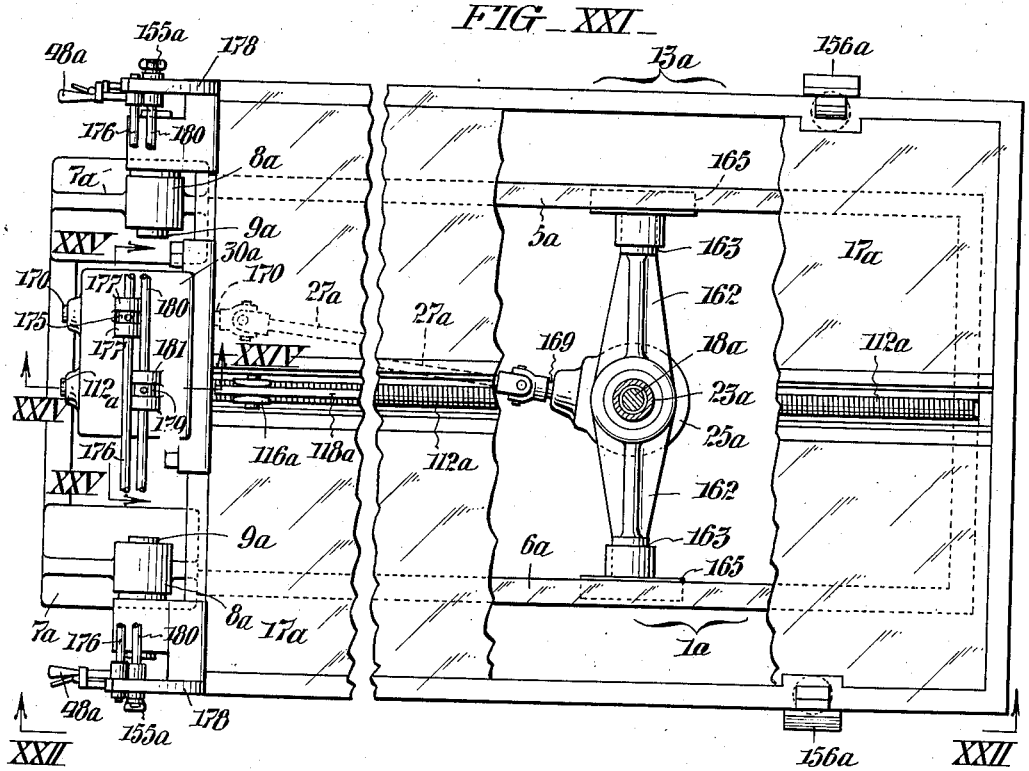
FIG_XXI_
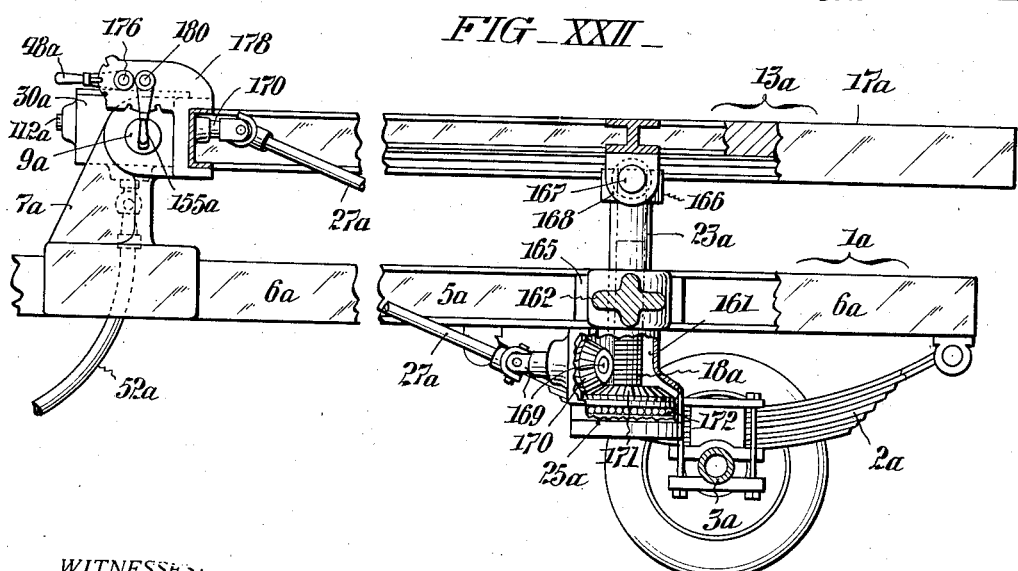
FIG_XXII_
INVENTOR:
Robert Faries,
BY Fraley Paul
ATTORNEYS.

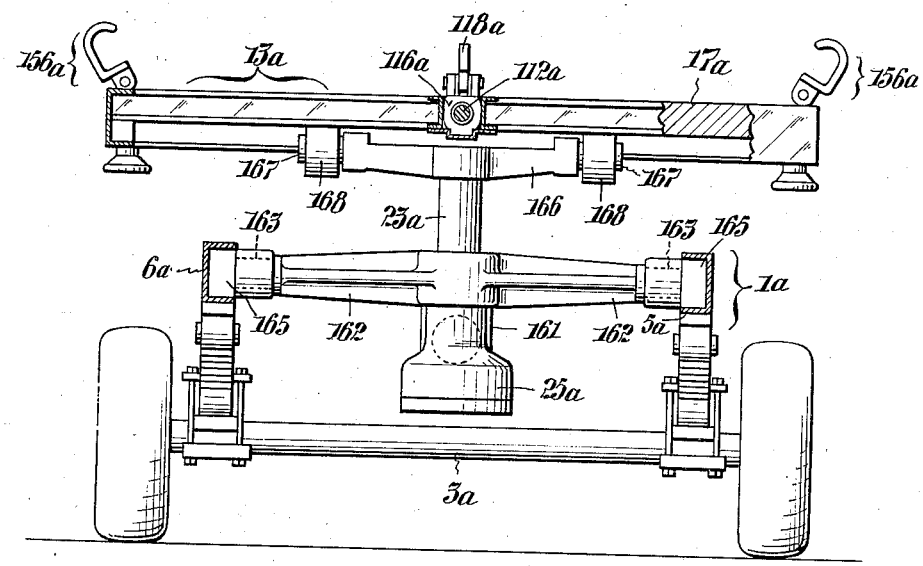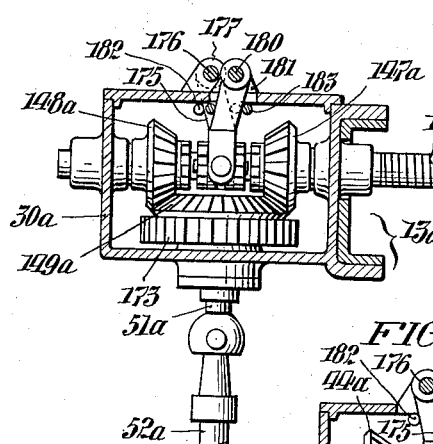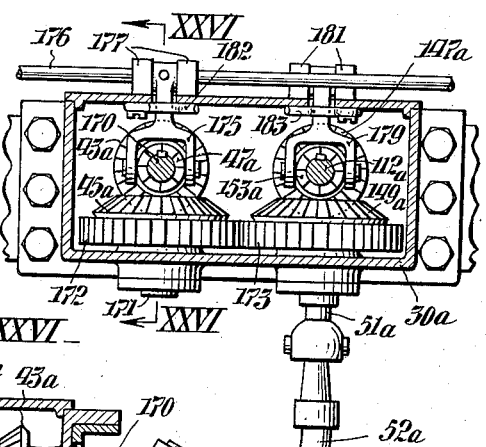

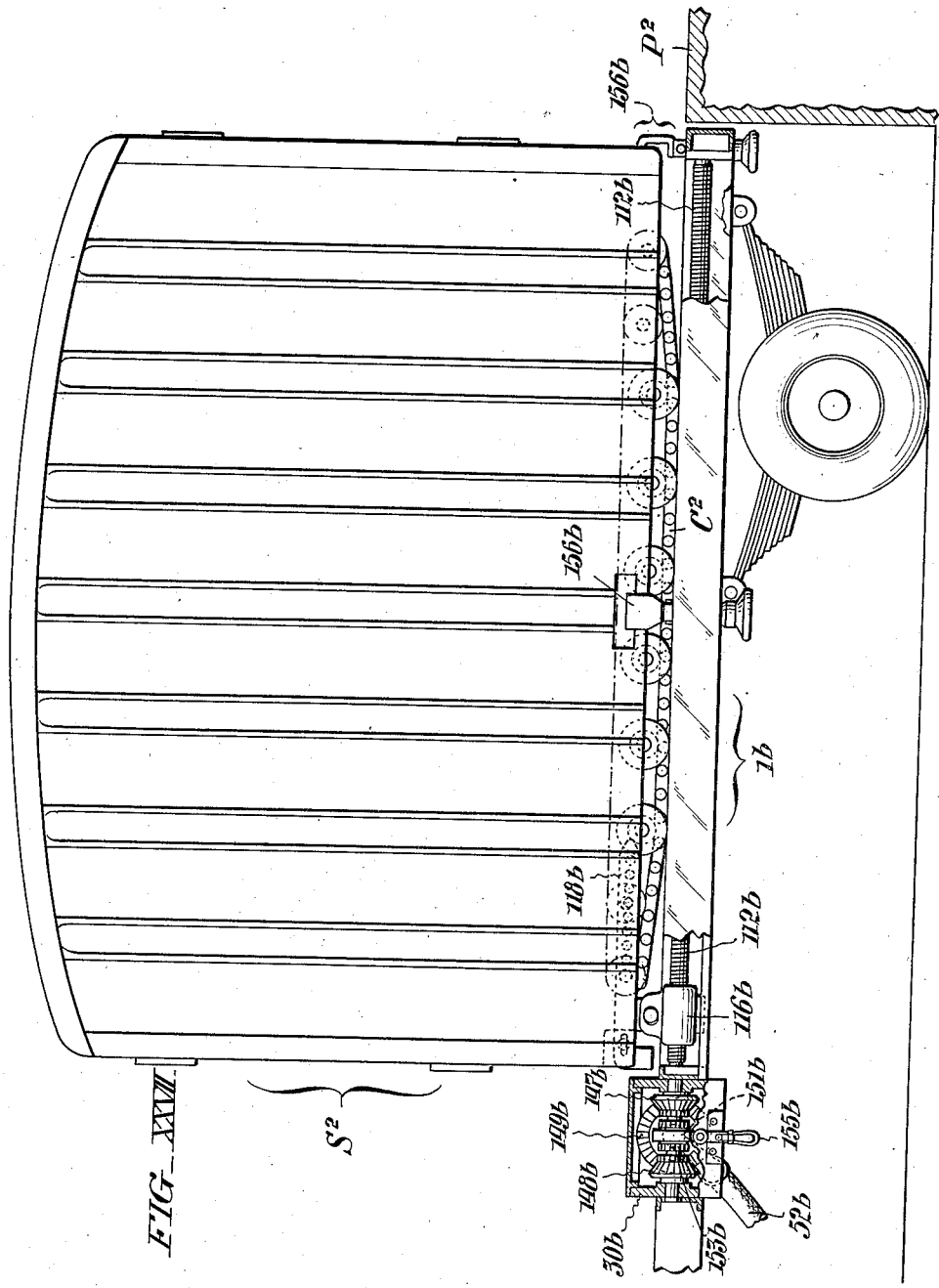

Oct. 11, 1938.   R. FARIES   2,132,612
TRUCK
Filed Oct. 1, 1936   16 Sheets-Sheet 13
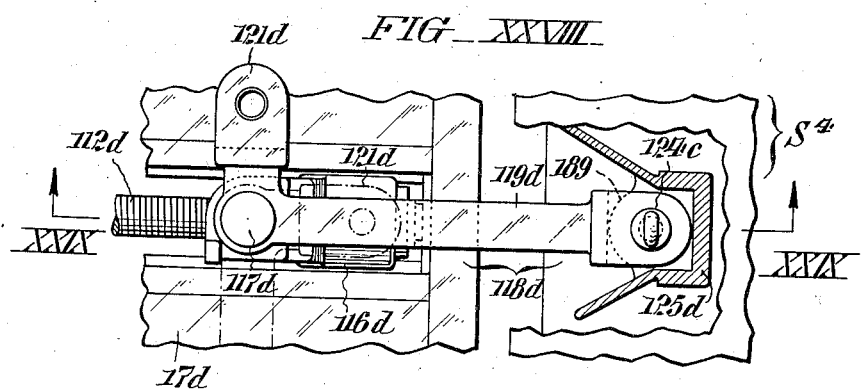
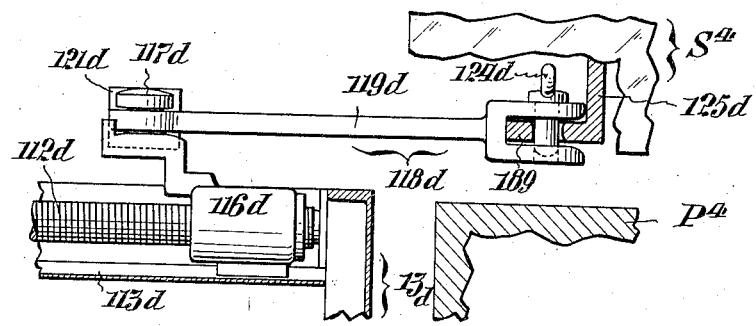
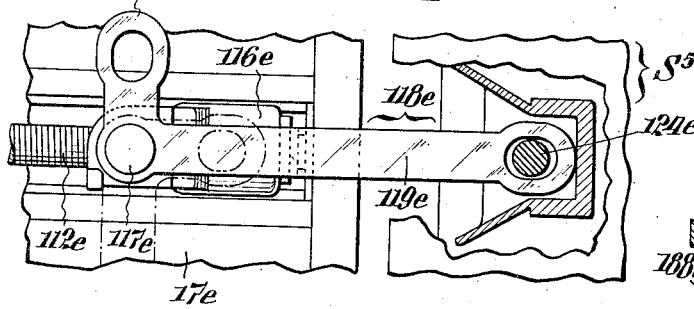
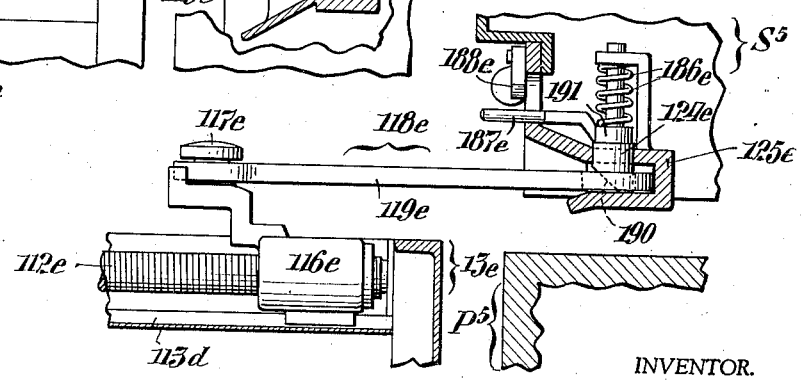
INVENTOR.
Robert Faries,
ATTORNEYS.

Oct. 11, 1938.         R. FARIES         2,132,612
TRUCK
Filed Oct. 1, 1936         16 Sheets-Sheet 14
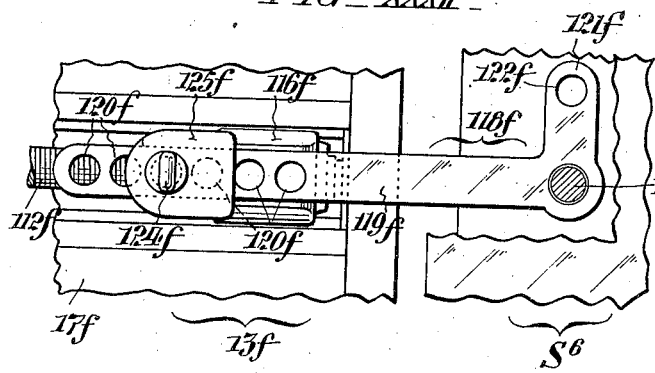
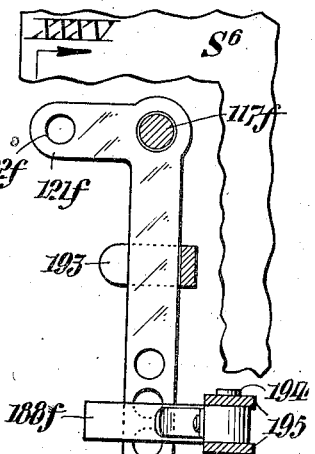
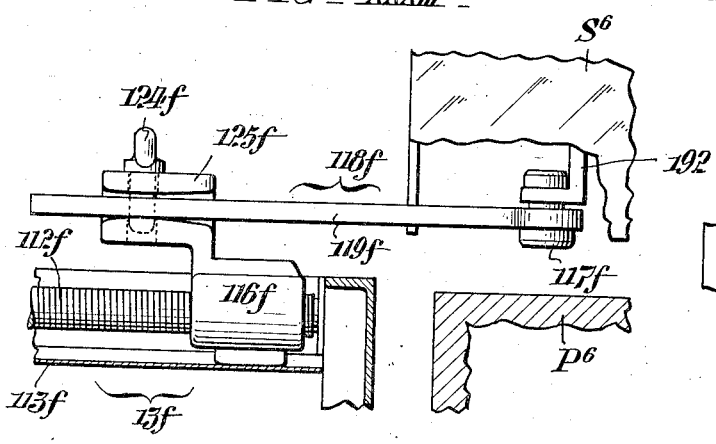
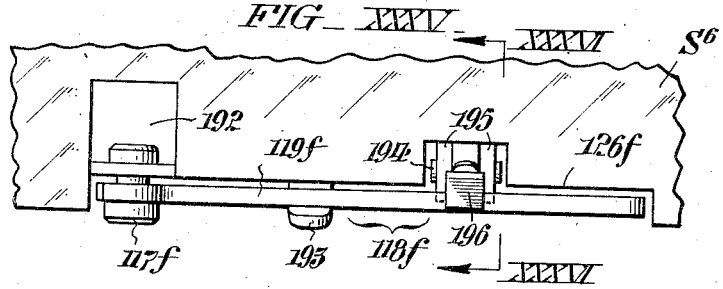
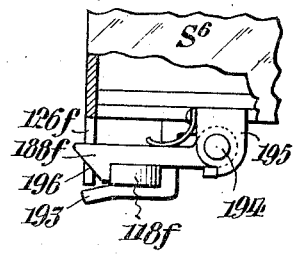
WITNESSES:
INVENTOR:
Robert Faries,
BY
ATTORNEYS.

Oct. 11, 1938.   R. FARIES   2,132,612
TRUCK
Filed Oct. 1, 1936    16 Sheets-Sheet 15
FIG. XXXVII
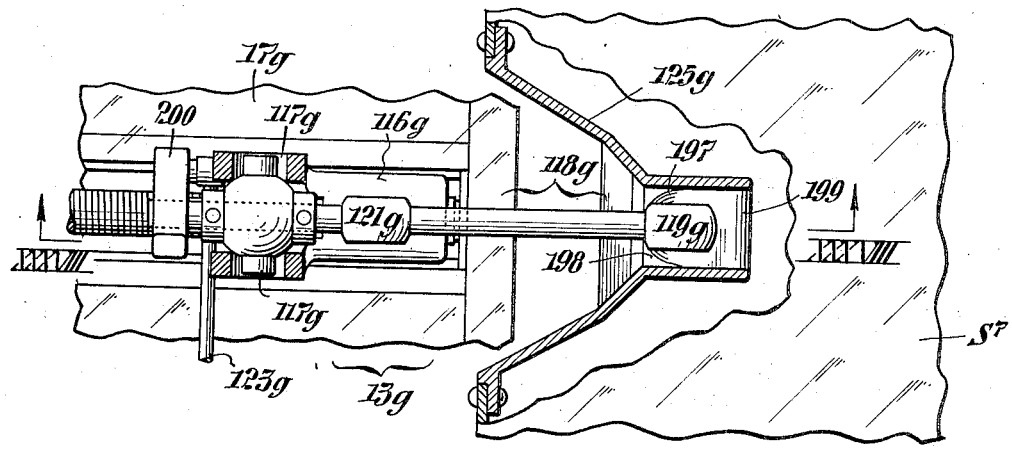
FIG. XXXVIII
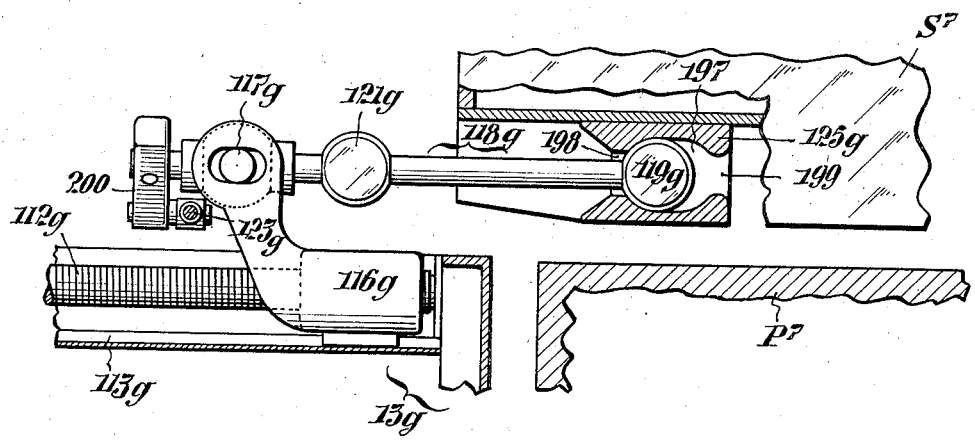
WITNESSES:
John E. Bergner
Hubert Fuchs
INVENTOR:
Robert Faries,
BY Frailey Paul
ATTORNEYS.

Oct. 11, 1938.  R. FARIES  2,132,612
TRUCK
Filed Oct. 1, 1936  16 Sheets—Sheet 16
FIG. XL
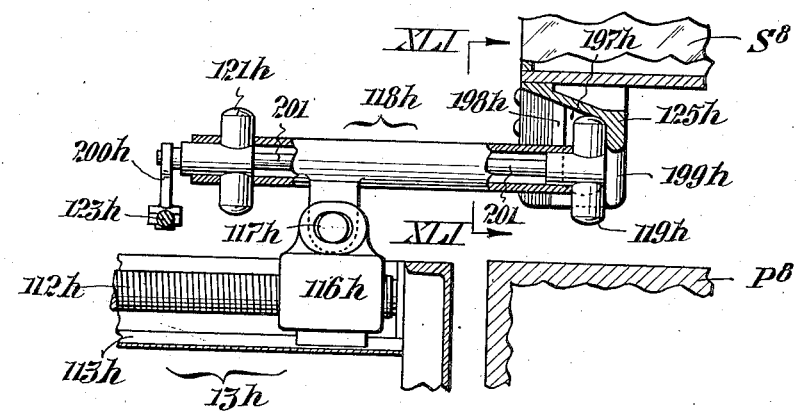
FIG. XXXIX
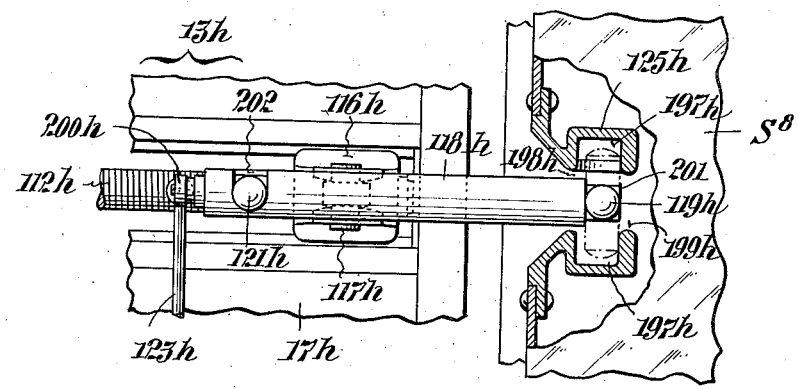
FIG. XLI
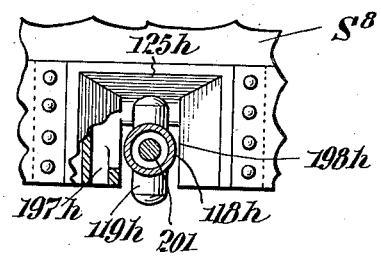
INVENTOR.
Robert Faries,
ATTORNEYS.

Patented Oct. 11, 1938

2,132,612

UNITED STATES PATENT OFFICE 2,132,612

TRUCK

Robert Faries, St. Davids, Pa.

Application October 1, 1936, Serial No. 103,502

20 Claims. (Cl. 214—65)

This invention relates to trucks; and it has reference more particularly to motor trucks with flat platforms for transporting containers such as are used in the shipment of freight in less than carload lots by rail.

In connection with trucks of the type specifically referred to, I aim to provide simple and reliable lifting mechanism whereby the truck platform can be raised or lowered to the levels of loading platforms of different heights to enable transfer of the containers from the one to the other without the aid of special lifting tackle such as is ordinarily required.

My invention is also directed toward the provision of safety means, whereby, upon vertical movement of the truck platform beyond prescribed limits with jack screw lifting mechanism, the jack screws are rendered inoperative for the protection of the lifting mechanism against derangement or injury.

My invention is further concerned with the provision of incorporated mechanism for moving the containers between the truck and loading platforms with ability to right the containers in case they should tend to deviate from a straight course of travel incident to being transferred to and from the truck platform.

Another object of my invention is to provide for the actuation of the lifting and transfer mechanisms aforesaid from a common power source driven from the truck motor under manual control.

Still another object of my invention is to provide for quick and easy coupling of the shipping container with, as well as for its quick and easy release from the transfer mechanism on the truck.

In addition to the foregoing, I aim to provide in a truck having the foregoing attributes, quick releasable means for securing the container against the possibility of shifting on the truck platform during transit.

Other objects and attendant advantages will appear from the following detailed description of the attached drawings, wherein Fig. I shows, in plan, a truck conveniently embodying my invention alongside a loading platform in readiness to receive a shipping container from said platform, a portion of the truck platform being broken out to expose important underlying details which would otherwise be hidden.

Fig. II is a view, partly in side elevation and partly in longitudinal section, taken as indicated by the arrows II—II in Fig. I.

Fig. III is a side elevation of a truck viewed as indicated by the arrows III—III in Fig. I, with a portion of the truck platform broken out and shown in longitudinal section.

Fig. IV shows the front elevation of the truck.

Fig. V is a fragmentary sectional view in plan taken as indicated by the arrows V—V in Figs. II and III.

Fig. VI is a view similar to Fig. V with certain of the parts in different positions.

Fig. VII is a fragmentary longitudinal section taken as indicated by the arrows VII—VII in Fig. I.

Fig. VIII is a fragmentary sectional view taken as indicated by the arrows VIII—VIII in Figs. I, II, and VII.

Fig. IX is a fragmentary sectional view taken as indicated by the arrows IX—IX, in Fig. I.

Fig. X is a fragmentary sectional view taken as indicated by the arrows X—X in Figs. I and V.

Figs. XI and XII are views corresponding to Fig. X with certain of the parts differently positioned.

Fig. XIII is a detail sectional view taken as indicated by the arrows XIII—XIII in Fig. I, showing one form of coupling means for connecting the shipping container to the transfer mechanism on the truck.

Fig. XIV is a detail view taken as indicated by the arrows XIV—XIV in Fig. XIII.

Fig. XV is a detail sectional view taken as indicated by the arrows XV—XV in Fig. XIV.

Fig. XVI is a fragmentary view partly in plan and partly in plan section showing an alternative form of coupling device.

Fig. XVII is a sectional view taken as indicated by the arrows XVII—XVII, in Fig. XVI.

Fig. XVIII is a fragmentary detail sectional view taken as indicated by the arrows XVIII—XVIII in Fig. I showing the means for securing the container against shifting on the truck during transit.

Fig. XIX is a view like Fig. XVIII with the parts differently positioned.

Fig. XX is a view looking as indicated by the arrows XX—XX in Fig. XIX with a portion of the truck platform broken out and in section.

Fig. XXI is a view corresponding to Fig. I showing an alternative form of my improved truck.

Fig. XXII is a side elevation of the truck viewed as indicated by the arrows XXII—XXII in Fig. XXI with portions of the truck broken out and in section.

Fig. XXIII is a view showing the truck partly in end elevation and partly in transverse section.

Fig. XXIV is a detail sectional view taken as indicated by the arrows XXIV—XXIV in Fig. XXI.

Figs. XXV is a detail sectional view taken as indicated by the arrows XXV—XXV in Fig. XXI.

Fig. XXVI is a detail sectional view taken as indicated by the arrows XXVI—XXVI in Fig. XXV.

Fig. XXVII is a view partly in side elevation and partly in longitudinal section of another alternative form of my improved truck.

Fig. XXVIII is a view like Fig. XVI of a modified coupling means.

Fig. XXIX is a sectional view taken as indicated by the arrows XXIX—XXIX in Fig. XXVIII.

Figs. XXX and XXXI are views corresponding to Figs. XXVIII and XXIX of another modified form of coupling means.

Figs. XXXII and XXXIII are views also like Figs. XXVIII and XXIX showing another type of coupling means.

Fig. XXXIV is a view similar to Fig. XXXII with certain of the parts differently positioned.

Fig. XXXV is a fragmentary view looking as indicated by the arrows XXXV—XXXV in Fig. XXXIV.

Fig. XXXVI is a detail sectional view taken as indicated by the arrows XXXVI—XXXVI in Fig. XXXV.

Fig. XXXVII is a fragmentary view partly in plan and partly in section of another form of coupling means.

Fig. XXXVIII is a section taken as indicated by the arrows XXXVIII—XXXVIII in Fig. XXXVII.

Figs. XXXIX and XL are detail views like Figs. XXXVII and XXXVIII of another form of coupling means; and Fig. XLI is a detail section taken as indicated by the arrows XLI—XLI in Fig. XL.

Considering the form of my invention delineated in Figs. I-XII and having more detailed reference first more particularly to Figs. I-IV of these illustrations, T comprehensively designates the truck, and P a raised loading platform to or from which shipping containers such as the one shown at S is to be taken, said container being mounted for sidewise mobility upon a pair of spaced caterpillar chains C. As featured, the truck T is of the semi-trailer type having its chassis frame 1 supported with interposition of leaf springs 2, by a wheel axle 3 at the rear end, and provided at its front end with a swivel coupling projection 4 for connection to a suitable "bogey" motor truck, not illustrated. Bolted at intervals to the inner face of the side rail 5 of the chassis frame 1 are upwardly reaching brackets 7 (see Figs. I, II, and VII) with spaced bearing bosses 8 supporting bushings 9. Engaging these bushings 9 in the intervals between the bosses 8 are pivot lugs 11 which are secured to the bottoms of the intermediate cross bars 12 of a supplemental horizontal structural iron frame 13 above the chassis frame 1, immediately inward of the side rail 15 of said supplemental frame. Incorporated with the supplemental frame 13 is a floor of concrete or the like with resultant formation of a flush topped platform 17 on which the container S is sustained during transit as shown in Fig. IV. Due to being pivotally supported along one of its side edges as just explained, the truck platform 17 can be moved either up or down as exemplified by the dot and dash lines in Fig. IV, and its free side edge thereby brought to the levels of loading platforms of different heights.

For the purpose of moving the truck platform 17 up and down about its pivotal connection with the chassis frame 1, there is provided a lifting mechanism which includes a plurality of vertical jack screws 18, see Figs. I and VIII. As shown, the tops of the jack screws 18 are pivotally connected at 19 to the upper ends of shackles or pivoted links 20 whereof the lower ends are similarly connected at 21 to suspension brackets 22 affixed to the bottom of the platform 17 in line with the intermediate cross bars 12 of the latter. Cooperating with the jack screws 18 are worm wheel nuts 23 (Figs. I, V, and IX) within housings 25 attached to the inner face of the side rail 6 of the chassis frame 1, said worm wheel nuts being operable in unison by as many individual intermeshing worms 26 on a longitudinal shaft 27 which is journaled in bearings 28 afforded by said housings 25. At the front of the truck, the shaft 27 extends through a sleeve 29 into a housing 30 secured to the outer face of the end rail 31 of the chassis frame 1, see Figs. I, V, and IX. The sleeve 29 is loose on the shaft 27 and formed at its outer end with a clutch face 33 which opposes an axially shiftable clutch collar 35 splined to said shaft, said collar having an actuating lever 36 which is swingable about a fixed pivot pin 37. A torsion spring 38 (Figs. V, VI, and X) is influential upon the lever 36 to normally retain the clutch collar 35 retracted from the clutch face 33 of the sleeve 29. Secured to the inner end of the sleeve 29 is a bevel gear pinion 39 which meshes with a similar pinion 40 at one end of a transverse shaft 41. As shown, the shaft 41 lies crosswise of the front of the chassis frame 1 with its opposite end extending into another housing 42 attached to said frame. Within the housing 42 (Fig. V), the shaft 41 carries a pair of spaced oppositely-disposed beveled pinions 43, 44 which are loose on said shaft and which mesh with a master bevel gear 45 on a countershaft 46 within said housing. By means of an axially-shiftable clutch collar 47 (Figs. IV and VII) on the shaft 41 operable through a pivoted control handle 48 at the exterior of the housing 42, the bevel pinions 43 and 44 can be selectively coupled with said shaft. Also affixed to the shaft 46 is a worm wheel 49 which is arranged to be driven by a worm 50 at the lower end of a vertical shaft 51 (Fig. VIII) within the housing 42, said shaft 51 extending down through the bottom of said housing for connection, by a flexible shaft 52, with the motor of the "bogey" truck used with the trailer truck of my invention. Medially pivoted to a lug 53 at the bottom of the housing 42 is a lever 54 whereof one end 55 engages an aperture 56 in the control handle 48 (Figs. V–VII), and whereof the other end has the form of a cam sector 57 with a central notch 58. Journaled in a fixed bracket 59 on the chassis frame 1 immediately adjacent the housing 42 is a short vertical shaft 60 with a roller arm 61 at its lower end to cooperate with the cam sector 57 of the lever 54. To the top of the shaft 60 is secured an arm 62, which, by means of a link rod 63, is coupled with a slide 64 confined to longitudinal movement in a fixed guide 66 adapted to the side rail 6 of the chassis frame 1. A tension spring 65 is influential upon the link rod 63 to keep the roller of the arm 61 in operative engagement with the cam end 57 of the lever 54. Pivoted to the outer end of the slide 64 is a finger 67 with a hook end 68 for engaging the end of an arm 69 on the clutch-actuating lever 36. Accordingly, when the control handle 48 is swung in one direction or the other to couple the bevel pinion 43, or the pinion 44 with the master bevel gear 45, the clutch collar 35 is concurrently shifted into engagement with the clutch face 33 of the sleeve 29 as shown in Fig. VI by action of the cam lever 54 and the interposed connections just described, so that motion is communicated concurrently in one direction or the other to the jack screws 18 with consequent raising or lowering of the platform 17 of the truck.

In order to relieve the jack screws 18 of the weight of the platform 17 and its load during travel of the truck, means are provided as follows:

Suspended from the bottom of the truck platform 17 near its free longitudinal edge are arcuate members 70 of which the curvature has its center in the pivot axis of said frame, see Figs. IV and VIII. As shown, these arcuate struts 70 are pivotally connected at their upper ends to lugs 71 fastened to the cross bars 12 of the truck platform 17 for capacity to adapt themselves to guides 72 affixed to the outer face of the side rail 6 of the chassis frame 1. From Figs. III, V, and VI, it will be observed that the struts 70 are of channel cross sectional configuration; and bolted within hollows of said struts are blocks 73 with lateral recesses 74 adapted to be engaged by stop bolts 75 when the truck platform 17 is in its normal horizontal position. As shown in Fig. VIII, the stop bolts 75 are longitudinally slotted at 76 for passage of a shaft 77, and are moreover vertically open as at 78 to clear eccentrics 79 on said shaft, which latter is journaled in the guides 72. By turning the shaft 77 to actuate the eccentrics 79, it will be evident that the stop bolts 75 will be withdrawn from the notches 74 in the blocks 73 on the struts 70 when the truck platform 17 is to be raised or lowered relative to its normal horizontal position. Affixed to the shaft 77 within the housing 30 is a spur pinion 80 which meshes with a spur gear 81 on a short shaft 82 also journaled within said housing. Meshing with a spur gear 83 affixed to the gear 81 is a gear sector 85 (Figs. IV, V, and VIII) which is fulcrumed on a fixed bearing 86 at the bottom of the housing 30 and provided with a pendant arm 87. A link rod 88 connects the sector arm 87 with the arm 89 of a control lever handle 90 which is swingable horizontally about a fulcrum axis 91 on the fixed bracket plate 59. As shown in Fig. V, the bracket plate 59 has a curved edge 92 concentric with the axis 91, and is formed with spaced notches 93 and 94 for engagement by a manually releasable latch member 95 associated with the control handle 90. Movement of the control handle 90 from the position shown in Fig. V to that shown in Fig. VI, will, through the intermediate connections just described, be attended by a partial rotation of the shaft 77 and incidental withdrawal of the stop bolts 75 from the struts 70. After this is accomplished, the jack screws 18 can be operated to raise or lower the intermediate frame 13 under control of the handle 48 in the manner already understood. Normally, the control handle 48 is locked in the vertical or neutral position centrally of the notched guide segment 95 with which its latch 96 cooperates, as shown in Figs. IV and V, by means of a clevised locking member 97. Near its clevised end, the locking member 97 engages a fixed guide 98 at the bottom of the housing 42 for confinement to longitudinal sliding movement, and at its opposite end has a pivotal connection at 99 with the control handle 90. Due to this arrangement, the control handle 90 must first be used to effect withdrawal of the stop bolts 75 from the struts 70 before the control handle 48 can be used to initiate operation of the jack screws 18. The locking member 79 thus constitutes a safety means to insure against derangement of the lifting mechanism or injury thereto.

Adjustably secured to the strut 70 nearest the front of the truck, is a correspondingly shaped cam piece 100 (Figs. IV, V, VI, X, XI) with edge notches 101, 102 equally spaced from a similar medial edge notch 103. When the truck platform is in its normal horizontal position, the medial notch 103 of the cam piece 100 is occupied by a roller 105 on the arm 69 of the clutch lever 36. Somewhat above and below its medial notch 103, the cam piece 100 has laterally projecting studs 106, 107 adapted to cooperate with the hook finger 67. Immediately, as the clutch lever 36 is swung to the position shown in Fig. VI by manipulation of the control handle 48, the roller 105 is withdrawn from the notch 103 of the cam piece 100 by means of the pivoted hook finger 67 of the slide 64 with attendant connection of the clutch 35. As the cam piece 100 moves up or down in following the movements of the truck platform 17, the finger 67 is swung about its pivotal connection with the slide 64 in opposition to springs shown at 109 through engagement thereof with the stud 106 or the stud 107 as the case may be, with attendant release of the clutch lever 36 to the action of the torsion spring 38. As the movement of the frame 13 continues, the roller 105 will roll along the edge segment 110 or the edge segment 111 of the cam piece 100 with the clutch collar 35 maintained in coupled engagement with the sleeve 29 to keep the jack screws 18 in operation. However, if the platform 13 is raised or lowered beyond the limits defined by the notches 101, 102 in the cam piece 100, the clutch collar 35 will be automatically retracted to inactive position by dropping of the roller 105 on the slide 64 into one of said notches, as exemplified in Fig. XII, with the hook member 67 swung aside and its hook end 68 resting on the projection 69, and the jack screws 18 idled as a consequence. Upon movement of the control handle 48 through its neutral position to reverse the lifting mechanism, the slide 64 will be retracted by the spring 65 and permit the finger 67 to resume its normal horizontal position with its hook end 68 forward of the projection of the clutch lever 36 as in Fig. X.

For the purpose of transferring the shipping container between the truck and the loading platform, I have provided mechanism including a pair of transverse screw spindles 112 which lie in the intervals between closely spaced pairs of auxiliary cross bars 113 on the truck platform 13. The ends of the screw spindles 112 are journaled in bearing blocks such as the one shown at 115 in Fig. VIII, set into the hollows of the channel side rails 15, 16 of the truck platform frame. Engaging the screw spindles 112 and held against rotation in the guideways formed jointly by the auxiliary cross bars 113 of the truck platform 13 are nut followers 116 which afford loose pivotal connections 117 for individually associated draft bars 118 which may be of the form detailed in Figs. XIII–XV. As shown, each of these draft bars 118 has at one side of the pivot 117 a relatively long portion 119 provided with a tapered end and a longitudinal series of apertures 120, while the portion 121 at the other side of said pivot is very much shorter and provided with but a single aperture 122. A connecting rod 123 serves to keep the draft bars 118 in parallel relation. The apertures in the draft bars 118 are adapted for selective engagement with coupling pins 124 which are removable from clevis blocks 125 set into access openings 126 at the sides of the shipping container S, below the container bottom. From Fig. XIII it will be noted that the slots of the clevis blocks 125 are beveled as at 127 and rounded as at 128 to facilitate entry of the draft bars 118 and to permit angular up and down movement of said bars about their pivotal connections 117 with the screw spindle followers 116. Respectively secured to the spindles 112 immediately inward of the side rail 15 of the truck platform frame are spur pinions 129 which mesh with companion spur gears 130, on short parallel shifts 131, within housings 132, attached to said rails. Through miter gear couples shown at 133, 134 and 135, 136 in Figs. I, II, and VIII, the short shafts 131 (and hence the screw spindles 112) are arranged to be driven respectively from aligned longitudinal shafts 137, 138 which are journaled in the pivot bushings 9 of the brackets 7. The miter pinion 134 is loose on the shaft 137 but can be coupled therewith by means of a clutch 139 (Figs. II and VIII) having a control handle 140. The bevel pinion 136 on the other hand, is fixed on the shaft 138 which latter can be coupled with the shaft 137 by means of a clutch 141 under control of a handle 142. At the front of the truck, a spur gear 143, on the shaft 137 meshes with a spur gear 145 on a shaft 146 which extends into the housing 42 (Figs. II and VII), and which, within said housing carries a pair of loosely mounted opposingly-arranged bevel pinions 147, 148. A bevel gear 149 common to the pinions 147, 148 is affixed with a worm wheel 150 to a counter shaft 151 also within the housing 42, said worm wheel meshing with another worm 152 on the vertical power shaft 51 hereinbefore mentioned. The bevel pinions 147, 148 are selectively connectible to the shaft 146 for reverse driving of the screw spindles 112 by means of an axially shiftable clutch collar 153, which, as shown in Figs. II, IV, VII, and VIII, is operable by a control handle 155 accessible at the exterior of the housing 42. As a result of this arrangement, the screw spindles 112 can be driven in unison in either direction when the bevel pinion 134 is coupled with the shaft 137 and the latter with the shaft 138, or said spindles driven independently under control of the clutches 139, 141. When a shipping container is to be moved onto the truck from the station platform, the draft bars 118 are engaged with the clevis blocks 125 on said container as shown in Figs. XIII-XV and the screw spindles 112 set into motion in the proper direction to shift the followers 116. After the followers 116 have traveled the length of the screw spindles 112, the coupling pins 124 are withdrawn from the clevis blocks 125 on the shipping container. The screw spindles 112 are thereupon reversed to advance the followers 116 until the apertures 122 in the short ends 121 of the draft bars 118 register with those in the clevis blocks 125 on the container, and upon recoupling the screw spindles are again operated as at first to bring said container into final position on the truck platform. If during this loading operation, it should be necessary to right the container from an angular path of travel, this may be readily effected through individual actuation of the screw spindles 112 by the control means provided for that purpose. Shifting of a container S from the truck to the station platform can obviously be effected by reversal of the above procedure.

At 156 in Figs. I-IV, I have shown quick release devices for securing the container S against shifting on the truck during transit. As detailed in Figs. XXVIII-XXX each such device 156 comprises a claw 157 which is adapted to engage an aperture 158 in one end wall of the shipping container, and which is pivotally connected at 159 to the top end of a vertical screw bolt 160 passing down through the flanges of the corresponding end rail of the truck platform 13. A hand nut 161 confined to rotation by the lower flange of the rail engages the threads at the lower end of the screw bolt 160. Normally, the claw 157 occupies the retracted position shown in dot and dash lines in Fig. XVIII so as to be out of the way when the container is moved onto or off the truck. After the container is in position on the truck platform, the claw 157 is first swung into the opening 158 in the container as shown in full lines in Fig. XVIII and thereafter drawn downward to the position shown in Fig. XIX into firm clamping engagement with the lower edge of the opening 158 by manipulation of the hand nut 161. As shown in Fig. XX the opening 158 is made quite wide to facilitate registration with the claw 157.

In the alternate embodiment of my truck illustrated in Figs. XXI-XXVI, the truck platform 13a is fulcrumed at its front end to swing about pivot pins 9a in bearings 8a afforded by upwardly-reaching brackets 7a at the corresponding end of the chassis frame 1a. The lifting mechanism for the platform 13a in this instance, includes a single central jack screw 18a which engages a vertical sleeve 23a confined to axial movement in the guide boss 161 of a housing 25a immediately forward of the wheel axle 3a. The housing 25a is supported centrally of a cross member 162 which is pivotally connected by means of trunnions 163 at its ends, to bearing blocks 165 set into the channels of the chassis frame side rails 5a, 6a. To the upper end of the sleeve 23a is secured a cross arm 166 whereof the ends are pivotally connected at 167 to pendant bearings 168 on the truck platform 13a. Accordingly, as the platform 13a is raised or lowered, the jack screw 18a can take various angular positions to accommodate the movement of said platform about its fulcrum connections 9a with the chassis frame 1a. Extending into the side of the housing 25a is a short shaft 169 with a bevel gear 170 at its inner end that meshes with a bevel gear 171 secured to the lower end of the jack screw 18a and resting on a thrust bearing 172 in the bottom of said housing. By means of a shaft section 27a with universal joints, the short shaft 169 is connected with a short shaft 170 that extends into a housing 30a attached to the platform 13a at the front end of the truck. Loose on the shaft 170 within the housing 30a is a pair of oppositely arranged bevel pinions 43a, 44a, in mesh with a master gear 45a on a vertical shaft 171. Through a pair of intermeshing spur gears 172, 173 within the housing 30a, the shaft 171 is arranged to be driven from another vertical shaft 51a which is coupled with a flexible shaft 52a leading from the motor of the "bogey" truck. Splined to the shaft 170 intermediate the bevel pinions 43a, 44a is a clutch collar 47a which is shiftable by an arm 175 on a transverse shaft 176 journaled in bearings 177 at the top of the housing 30a and in fixed bearing brackets 178 at opposite sides of the pivoted end of the platform 17a. To the ends of the shaft 176 are secured control handles 48a whereby the clutch collar 47a can be shifted selectively into engagement with the bevel pinions 43a, 44a for rotation of the jack screw 18a in one direction or the other as required in raising or lowering of the platform 13a. Also in this instance, a single screw spindle 112a is relied upon to move the container S onto and off the platform. As shown, the spindle 112a lies in the interval between a pair of spaced longitudinals centrally of the truck platform 13a. With the screw spindle follower 116a is associated a coupling bar 118a which is exactly like the coupling bars of the first-described embodiment. As shown, in Figs. XXI and XXIV, the screw spindle 112a extends into the housing 30a and within the latter carries a pair of loosely mounted bevel gear pinions 147a, 148a in meshing engagement with a master bevel gear 149a on the vertical power shaft 51a. The pinions 147a, 148a are selectively connectible to the spindle 112a by means of a clutch collar 153a whereof the actuating lever 179 is fixed to the ends of another cross shaft 180 which parallels the shaft 176 and which is journaled in bearings 181 at the top of the housing 30a and in the bearing brackets 178. At its ends, the shaft 180 is provided with control handles 155a conveniently accessible at opposite sides of the truck. The clutch collars 47a and 151a are normally held in the neutral position as illustrated by spring fingers 182 and 183 respectively. The devices shown at 156a for securing the container to the truck platform 13a may be like those of the first described embodiment of my invention.

In the modified truck of Fig. XXVII, a platform is dispensed with and the containers S² supported directly by the chassis frame 1b. Here, as in the form shown in Figs. XXI-XXVI, the transfer mechanism comprises but a single longitudinal screw spindle 112b, a follower 116b, and a coupling bar 118b, said spindle extending into a housing 30b at the front end of the chassis frame 1b. Opposing bevel pinions 147b, 148b, loose on the portion of the spindle 112b within the housing 30b mesh with a master gear 149b on a counter shaft 151b with a flexible extension 52b leading from the "bogey" truck motor. A clutch collar 153b operable by a handle 155b enables selective coupling of the bevel gear pinions 147b, 148b for rotation of the screw spindle 112b in opposite directions.

Figs. XVI and XVII show an alternate coupling arrangement wherein the opening into the clevis block 125c on the container S³ is transversely flared as at 185 to facilitate entry of the coupling bar 118c and to permit lateral movement of said bar as indicated in dot and dash lines in Fig. XVI during transfer of the container S³ to and from the truck. The coupling pin 124c, it will be noted, is urged forwardly by a spring 186 and can be locked in retracted position by engaging a lateral projection 187 thereon with a pivoted keeper 188 on the container S³. As a consequence of this construction, upon retraction of the keeper 188, the coupling pin 124c will automatically seek its active position after entry of the coupling bar 118c into the clevis block 125c.

In Figs. XXVIII and XXIX, the portions 119d, 121d of the coupling bar 118d are at right angles and said bar swivelly connected to the follower 116d at 117d with capacity to be swung in a horizontal plane for selective use of said portions in coupling. Here also, the ends of the bar ends 119d, 121d are clevised to straddle a transverse horizontal web 189 of the block 125d and the coupling pin 124d passed vertically through the registering apertures of said bar and block.

The coupling bar 118e of Figs. XXX and XXXI is generally like that of Figs. XXVIII, XXIX except that its ends are plain and adapted to engage a horizontal clevis in the block 125e on the container S⁵. The vertical coupling pin 124e in this instance is subject to a spring 186e and chamfered at the bottom end as at 190 so that it can yield to displacement incident to entry of the bar 118e into the clevis of the block 125e and to snap automatically into active position upon registry of the holes in said bar with that of the block. A pivoted keeper 188e is also here provided on the container S⁵ to cooperate with the handle projection 187e of a collar 191 on the pin 124e to hold the said pin in raised or retracted position if desired.

In Figs. XXXII-XXXVI, the coupling bar 118f is of right-angle configuration and pivotally connected at 117f to a bracket 192 on the container S⁶. The screw spindle follower 116f is on the other hand provided with a clevis portion 125f to receive the coupling bar 118f. Normally, the coupling bar 118f is swung into the recesses 126f provided for it in the side of the container S⁶ as shown in Figs. XXXIV-XXXVI, so as to be out of the way. When in its retracted position, the coupling bar 118f is supported by an underreaching clip 193 within the recess 126f of the container S⁶, and held in its retracted position by a spring pressed latch keeper 188f which is pivoted at 194 to a lug 195 within the recess 126f. To release the coupling bar, it is merely necessary to lift the latch as will be readily understood from Fig. XXXVI. As the bar 118f is swung into the recess 126f, it engages the beveled end 196 of the keeper 188f and thus displaces the latter upwardly until it rests fully upon the supporting clip 193 whereupon said keeper automatically drops back into active position.

In Figs. XXXVII and XXXVIII, the coupling bar 118g is provided with a flat sided spherical end head 119g, and with a similar head 121g adjacent a universal pivot connection 117g with the screw spindle follower 116g. The block 125g on the container S⁷ has a spherical socket hollow 197 with horizontally narrow approaches 198, 199 to receive the heads 119g, 121g of the coupling bar 118g. With this modified arrangement, the coupling bar 118g is turned through a right angle from the illustrated portion with its flattened heads 119g, 121g lying horizontally to permit passage of the heads through the narrow approaches 198, 199 of the hollow 197 in the block 125g. After the one or the other of the heads 119g, 121g reaches the central hollow 197, the coupling bar 118g is turned back to the illustrated position with resultant interlocking of such head with the block 125g. Turning of the coupling bar 118g as just explained may be effected by longitudinal shifting of the rod 123g which connects a crank arm 200 on the inner end of said bar with a similar arm of another bar.

In the modified form shown in Figs. XXXIX-XLI, the coupling bar 118h is in the form of a sleeve which surrounds a rod 200 having spaced cross heads 119h, 121h at opposite sides of its pivotal connection 117h with the screw spindle follower 116h. At the inner end, the rod 201 has a crank arm 200h which is connected by the link 123h with the corresponding rod of a companion coupling bar. As shown in Fig. XXXIX, the sleeve 118h is provided with a circumferential slot 202 which will permit turning of the rod 201 through an angle of ninety degrees. The block 125h on the container S⁸ is provided with a vertical opening 198h, 199h having lateral recesses 197h. In coupling, the rod 201 is turned to the position shown so that the heads 119h, 121h occupy a vertical position for capacity to pass into or through the vertical openings 198h, 199h in the block 125h whereupon said rod is turned through a right angle to engage the end of either such head within the lateral recesses 197h and thereby lock the coupling bar 118h to the container.

The various alternative forms of coupling devices shown in Figs. XVII–XLI, can be used in lieu of the form featured in the assembly drawings of the different types of my improved truck shown in Figs. I–IV, XXI–XXVII without entailing any changes whatever in the construction of the lifting and transfer mechanisms.

While I have herein illustrated my invention as a semitrailer truck, it is not to be considered as limited in this respect since the various features which characterize it can be obviously incorporated in a four wheel motor truck without sacrifice of any of the advantages hereinbefore particularly pointed out.

Having thus described my invention, I claim:

1. A truck comprising a platform with a horizontal supporting fulcrum; and means for moving the platform about its fulcrum to bring one of its edges to the levels of loading platforms of different heights including a jack screw, a shackle pivotally connected at one end direct to the jack screw and similarly connected at the other end to the truck platform beyond the fulcrum axis, a nut element confined against axial movement, and reversible means whereby the nut element can be rotated in opposite directions.

2. A truck comprising a platform with a horizontal supporting fulcrum; mechanism whereby the platform can be moved on its fulcrum to bring one of its edges to the levels of loading platforms of different heights including a jack screw, and reversible actuating means for rotating the jack screw; means for normally locking the actuating means against operation; retractable auxiliary means for supporting the weight of the platform to relieve the jack screw during transit; and control means with connections whereby the locking means aforesaid is operated to release the actuating means upon retraction of the auxiliary platform supporting means.

3. A truck according to claim 2, wherein the auxiliary means for supporting the weight of the platform to relieve the jack screw during transit includes an arcuate strut concentric with the fulcrum axis and movable with said platform, and a retractable locking member for engaging an edge notch in said strut.

4. A truck comprising a platform; and transfer means for moving a shipping container laterally onto and off the platform including a pair of laterally-spaced horizontal screw spindles, followers on the spindles; means for coupling the container with the spindle followers; and reversible means for rotating the spindles either in unison or individually.

5. A truck comprising a platform with a horizontal supporting fulcrum; means for moving the platform on its fulcrum to bring one of its edges to the levels of platforms of different heights; transfer means for moving a shipping container onto and off the truck including a screw spindle rotatively supported by the platform, a follower on the spindle, means for coupling the shipping container with the spindle followers, a shaft co-axial with the platform fulcrum, gear connections between the screw spindle and the shaft, and reversible means for rotating the shaft in opposite directions.

6. A truck comprising a platform with a horizontal supporting fulcrum; means for moving the platform in its fulcrum to bring one of its edges to the levels of platforms of different heights; transfer means for moving a shipping container onto and off the truck including a pair of laterally-spaced screw spindles rotatively supported by the platform, followers on the spindles, and means for coupling the shipping container with the spindle followers; reversible means controllable for rotating the spindles either in unison in the same direction or individually in opposite directions including a divided shaft co-axial with the platform fulcrum axis, intermeshing gears respectively fixed on one of the spindles and on one of the shaft sections, a gear fixed on the other spindle and meshing with a gear loose on the other shaft section, a clutch whereby the loose gear may be connected or disconnected from the last mentioned shaft section, a pair of opposed bevel pinions loose on the last mentioned shaft, a power shaft, a master bevel gear on the power shaft meshing with said bevel pinions, and a clutch whereby said pinions may be selectively connected to the master bevel gear.

7. A truck comprising a platform; means incorporated with the platform for moving the container onto or off the truck; and means for securing the container against shifting during transit including claws pivotally supported so as to be swingable laterally and adapted to hook into openings in the sides of the containers, said claws being pivotally connected to vertical screws supporting the claws as aforesaid at the edges of the platform, and nut means associated with the screws to draw the clamps in securing the containers.

8. A truck comprising a platform; and transfer means for moving shipping containers onto and off the platform, including a screw spindle journaled at its ends in fixed bearings on the platform, a follower on the spindle, and a horizontal coupling bar pivotally connected intermediate its ends to the spindle follower and having provisions at opposite sides of the pivot for selective connection to the container within a recess in the side of the latter.

9. A truck comprising a platform; and transfer means for moving a shipping container onto and off the platform, including a screw spindle with journal support at opposite ends in fixed bearings on the platform, a follower engaging the spindle, a coupling bar connected to the follower with capacity for universal pivotal movement and for rotation about its own axis, and adapted to engage a block recessed into the side of the container, said bar having a head capable of entering a hollow within the block and of being locked within the hollow by a partial turn of the coupling bar.

10. A truck comprising a platform; and transfer means for moving a shipping container onto and off the platform including a screw spindle with journal support at opposite ends in fixed bearings on the platform, a follower engaging the spindle, a coupling bar connected to the follower with capacity for universal pivotal movement and for rotation about its own axis and adapted to engage a block recessed into the side of the container, said bar having flat-sided spherical head capable of entering a spherical socket opening in the block by way of a narrow straight-sided passage and of being thereupon interlocked with said socket by partial turn of the coupling bar.

11. A truck comprising a platform with a horizontal supporting fulcrum; lifting mechanism for moving the platform on its fulcrum whereby one of its edges may be brought to the levels of the platforms of different heights; releasible means for locking the truck platform against accidental movement during transit; power means for actuating the lifting mechanism; and means for preventing operation of the lifting mechanism by the power means while the truck platform is restrained by the locking means.

12. A truck comprising a platform with a horizontal supporting fulcrum; lifting mechanism for moving the platform on its fulcrum so that one of its edges may be brought to the levels of the platforms of different heights; releasible means for locking the truck platform against accidental movement during transit; power means for actuating the lifting mechanism; a manual control member whereby the lifting means can be operatively connected to and disconnected from the power means; and means interposed between the locking means and the control member to prevent manipulation of the latter while the platform is restrained by said locking means.

13. A truck according to claim 11, including means for automatically disconnecting the lifting means from the power means upon movement of the platform beyond prescribed limits in either direction vertically.

14. A truck according to claim 11, including means separately controlled and operable from the power means for moving shipping containers onto and off the truck platform.

15. A truck according to claim 11, including conveyor means for moving containers and the like onto and off the truck platform; and releasible means for coupling the containers with said conveyor means.

16. A truck according to claim 11, including conveyor means for moving shipping containers and the like onto and off the truck platform; and self-engaging coupling means for coupling the containers with said conveyor means.

17. A truck according to claim 11, including conveyor means for moving shipping containers and the like onto and off the truck platform; and means for locking the containers to the carriage platform to hold them against accidental movement during transit.

18. A truck comprising a platform with a horizontal supporting fulcrum; lifting means for moving the platform on its fulcrum so that one of its edges can be brought to the level of loading platforms of different heights; and means for relieving the lifting means of the weight of the truck platform during transit including a strut-like support curved concentrically with the fulcrum axis, and a latch member for coacting with said support.

19. A truck comprising a platform with a horizontal supporting fulcrum; lifting means for moving the platform on its fulcrum so that one of its edges may be brought to the level of loading platforms of different heights; and means for relieving the lifting means of the weight of the truck platform during transit including a strut curved concentrically with the fulcrum axis and movable with said truck platform, and a retractable latch member for engaging an edge notch in said strut.

20. A truck according to claim 1, including auxiliary means for supporting the weight of the platform to relieve the jack screw during travel of the truck.

ROBERT FARIES.